United States Patent
Chung et al.

(10) Patent No.: US 7,356,220 B2
(45) Date of Patent: Apr. 8, 2008

(54) APPARATUS AND METHOD FOR REDUCING SIGNAL NOISE AND OCDMA RECEIVER AND METHOD

(75) Inventors: Hwan Seok Chung, Daejeon (KR); Heuk Park, Daejeon (KR); Kwang Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 218 days.

(21) Appl. No.: 11/399,115

(22) Filed: Apr. 5, 2006

(65) Prior Publication Data

US 2007/0097854 A1   May 3, 2007

(30) Foreign Application Priority Data

Oct. 27, 2005   (KR) .................. 10-2005-0101740

(51) Int. Cl.
*G02B 6/26* (2006.01)

(52) U.S. Cl. ...................................................... 385/27

(58) Field of Classification Search .................. 385/27, 385/15, 24, 1, 2, 4, 31, 37, 38; 398/190, 398/202, 42, 77, 78, 140

See application file for complete search history.

(56) References Cited

U.S. PATENT DOCUMENTS

| | | | |
|---|---|---|---|
| 6,614,950 B2 * | 9/2003 | Huang et al. | 385/15 |
| 6,807,372 B1 * | 10/2004 | Lee et al. | 385/24 |
| 6,912,338 B2 | 6/2005 | Sotobayashi et al. | |
| 7,130,292 B2 * | 10/2006 | Turpin et al. | 370/342 |
| 2003/0035187 A1 | 2/2003 | Richardson et al. | |
| 2004/0037500 A1 | 2/2004 | Yoo | |
| 2004/0091262 A1 * | 5/2004 | Pohjola et al. | 398/42 |
| 2004/0096226 A1 * | 5/2004 | Hiironen et al. | 398/202 |
| 2004/0170439 A1 * | 9/2004 | Hiironen | 398/190 |
| 2005/0084266 A1 * | 4/2005 | Pohjola et al. | 398/77 |
| 2005/0100338 A1 * | 5/2005 | Yeon et al. | 398/78 |
| 2006/0156158 A1 * | 7/2006 | Yeon et al. | 714/746 |
| 2007/0036553 A1 * | 2/2007 | Etemad et al. | 398/140 |

FOREIGN PATENT DOCUMENTS

WO   WO03 003621   1/2003

OTHER PUBLICATIONS

Xu Wang et al, "10-user, truly-asynchronous OCDMA experiment with 511-chip SSFBG en/decoder and SC-based optical thresholder," 2nd International Symposium on Ultrafast Photonic Technologies, Aug. 1-3, 2005, University of St. Andrews.

(Continued)

*Primary Examiner*—Quyen P Leung
(74) *Attorney, Agent, or Firm*—Ladas & Parry LLP (57) ABSTRACT

Provided are an apparatus and a method for reducing a signal noise of an OCDMA receiver and an OCDMA receiver and method. The includes: a clock recovery unit extracting sine wave clock from an output signal of an OCDMA decoder including an MAI (multiple access interference) noise; a time gating unit separating an auto-correlation peak signal and the MAI noise from the output signal of the OCDMA decoder using the sine wave clock; and an optical interferometer removing an SI (signal interference) noise remaining in the auto-correlation peak signal.

16 Claims, 10 Drawing Sheets

OTHER PUBLICATIONS

Zhi-Jiang et al, "Four-User 10-Gb/s Spectrally Phase-Coded O-CDMA System Operating at ~30fJ/bit," IEEE Photonics Technology Letters, vol. 17, No. 3, Mar. 2005, pp. 705-707.

Vincent J. Hernandez et al, "Spectral Phase-Encoded Time-Spreading (SPECTS) Optical Code-Division Multiple Access for Terabit Optical Access Networks," Journal of Lightwave Technology, vol. 22, No. 11, Nov. 2004, pp. 2671-2679.

Julien Faucher et al. "Multiuser OCDMA System Demonstrator With Full CDR Using a Novel OCDMA Receiver." IEEE Photonics Technology Letters, vol. 17, No. 5, May 5, 2005. pp. 1115-1117.

Kenji Wakafuji et al. "Direct-Detection Optical CDMA Receiver With Interference Estimation and Double Optical Hardlimiters." Journal of Lightwave Technology, vol. 21, No. 10, Oct. 10, 2003, pp. 2182-2188.

* cited by examiner

APPARATUS AND METHOD FOR REDUCING SIGNAL NOISE AND OCDMA RECEIVER AND METHOD

CROSS-REFERENCE TO RELATED PATENT APPLICATION

This application claims the benefit of Korean Patent Application No. 10-2005-0101740, filed on Oct. 27, 2005, in the Korean Intellectual Property Office, the disclosure of which is incorporated herein in its entirety by reference.

BACKGROUND OF THE INVENTION

The present invention relates to an apparatus and a method for reducing a signal noise of an optical code division multiple access (OCDMA) receiver and an OCDMA receiver and method using the apparatus and the method, and more particularly, to an apparatus and a method for reducing a signal noise of an OCDMA receiver occurring when a plurality of channels access at the same time so as to prevent a performance of the OCDMA receiver from being deteriorated and an OCDMA receiver and method using the apparatus and the method.

DESCRIPTION OF THE RELATED ART

Apparatuses connecting two nonlinear optical loop mirrors (NOLMs) in series to suppress optical noise have been suggested as conventional OCDMA receivers.

In a first structure of the apparatuses connecting the two NOLMs in series to suppress the optical noise, the two NOLMs include loops having couplers, polarization controllers, and nonlinear optical fibers, extract a main lobe of a signal decoded by the first NOLM using cross-phase modulation (XPM) and self-phase modulation (SPM) occurring in the nonlinear optical fibers, and remove noise remaining in the second NOLM.

A second structure of the apparatuses increases a signal-to-noise rate (SNR) using one NOLM and controls an optical power value of a signal applied to the NOLM to reduce a pulse width of an output signal, so as to improve the quality of a signal. However, a high optical power of 1 W or more is required to vary the pulse width.

In a third structure of the apparatuses, XPM occurring in a highly nonlinear fiber is used to distinguish a signal from a noise. If the signal is "1," large phase modulation occurs, and thus a wavelength of the signal moves to a long wavelength. If the signal "0," the wavelength of the signal is fixed to an existing wavelength. Thus, a long wavelength is selected as a filter, noise on level "0" is remarkably reduced, and a predetermined portion of noise on level "1" can be suppressed due to variations in phase and/or intensity occurring in the filter.

However, existing methods using nonlinear optical fibers require high optical powers to remove noise, are based on optical fibers, and require optical fiber amplifiers outputting great powers. Thus, OCDMA receivers cannot be easily implemented with compact size. An increase of an optical power of a multiple access interference (MAI) noise with an increase in a number of channels cannot be prevented as described above. Thus, a noise reducing apparatus cannot accommodate several channels at the same time.

Apparatuses constituting two semiconductor optical amplifiers (SOAs) as Mach-Zehnder interferometers (MZIs) to separate noise from a signal have been suggested as apparatuses for reducing noise of OCDMAs.

Pulses output from a decoder are separated and delayed so as to be input to two SOAs. The pulses cause XPM in probe light advancing in the same direction as a signal in the SOAs to generate an interference phenomenon at an output node so as to distinguish noise from an auto-correlation peak signal. However, the apparatuses cannot remove MAI caused by an increase in a number of channels. Thus, a noise reducing apparatus cannot accommodate several OCDMA signals.

Therefore, an apparatus for removing an increase in MAI of a side lobe due to an increase in a number of channels to prevent an increase in an optical power input to a noise reducing apparatus and reducing noise at a low power is required.

SUMMARY OF THE INVENTION

The present invention provides an apparatus and a method for reducing a signal noise of a small, easily integrated OCDMA receiver including a semiconductor-based time gating unit and an optical interferometer to remove multiple access interference(MAI) and signal interference(SI) noises at a low power, easily vary a pulse width of an optical signal, increase a power dynamic range of the OCDMA receiver so as to increase a number of simultaneously accessible OCDMA channels.

According to an aspect of the present invention, there is provided an apparatus for reducing a signal noise of an OCDMA (optical code division multiple access) receiver, including: a clock recovery unit extracting sine wave clock from an output signal of an OCDMA decoder comprising an MAI (multiple access interference) noise; a time gating unit separating an auto-correlation peak signal and the MAI noise from the output of the OCDMA decoder using the sine wave clock; and an optical interferometer removing an SI (signal interference) noise remaining in the auto-correlation peak signal.

According to another aspect of the present invention, there is provided a method of reducing a signal noise of an OCDMA receiver, including: extracting a sine wave clock from an output signal of an OCDMA decoder comprising an MAI noise; separating an auto-correlation peak signal and the MAI noise from the output of the OCDMA decoder using the sine wave clock; and removing an SI noise remaining in the auto-correlation peak signal.

According to another aspect of the present invention, there is provided an OCDMA receiver including: an OCDMA decoder decoding and outputting an input signal; a noise reducing apparatus separating an auto-correlation peak signal and an MAI noise using a sine wave clock extracted from an output of the OCDMA decoder and removing an SI noise remaining in the auto-correlation peak signal; and a photoelectric data converter converting the auto-correlation peak signal form which the SI noise has been removed into an electric signal using the sine wave clock.

According to another aspect of the present invention, there is provided a method of receiving an OCDMA, including: decoding an input signal to output an auto-correlation peak signal comprising an MAI noise; extracting a sine wave clock from the auto-correlation peak signal comprising the MAI noise; separating the auto-correlation peak signal and the MAI noise using the extracted sine wave clock; removing an SI noise remaining in the auto-correlation peak signal from which the MAI noise has been removed; and converting the auto-correlation peak signal into an electric signal using the extracted sine wave clock.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the prevent invention will be described with reference to the attached drawings.

Figure 1:
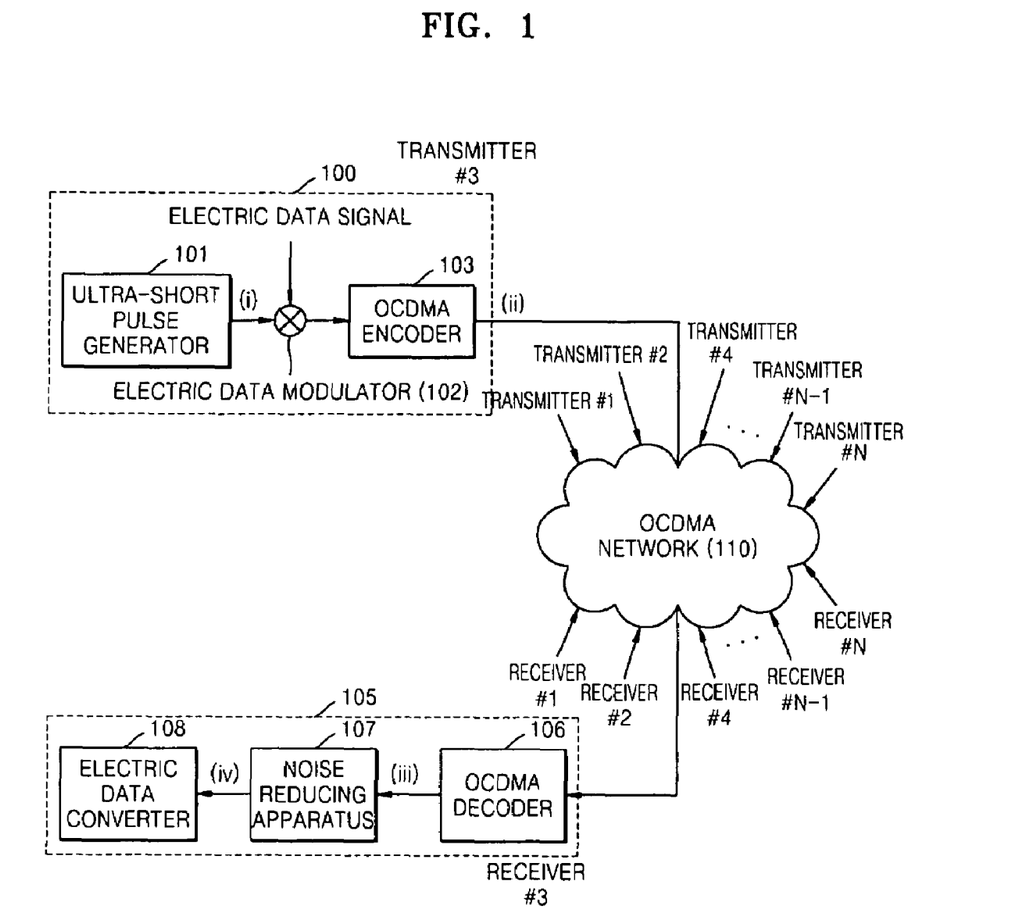
FIG. 1 is a block diagram illustrating an operation principle of an OCDMA system.

FIG. 1 is a block diagram illustrating an operation principle of an OCDMA system.

In an OCDMA transmitter 100 OCDMA, an ultra-short pulse generator 101 generates return-to-zero (RZ) pulses having a short pulse width, an electric data modulator 102 modulates the RZ pulses into a data signal, and the data signal is input to an OCDMA encoder 103. Encoding of a signal can be performed in a time domain or a wavelength domain.

Time domain encoding is performed by dividing a bit interval into a plurality of shorter intervals, i.e., into chips, classifying input pulses into several pulses, and delaying the pulses for different times. Wavelength domain encoding is performed by dividing ultra-short pulses having a short pulse width in a wide wavelength band into short wavelength bands, i.e., into chips, and phase modulating wavelength components input according to predetermined codes.

An OCDMA receiver 105 performs decoding to recover a signal. If an input signal suitable for predetermined codes, an OCDMA decoder 106 generates an auto-correlation peak having a narrow pulse width and a great power. The auto-correlation peak is input to a noise reducing apparatus 107 to remove a remaining noise and then input to an electric data converter 108.

However, the pulse width of the decoded auto-correlation peak is less than or equal to several ps. Thus, if the bandwidth of an electric data converter is not more than or equal to several hundreds of GHz, an intensity of the recovered signal is reduced. Also, if the number of used chips is less than or equal to several hundreds, an MAI noise does not spread in a time domain. Thus, levels of a signal and a noise become similar to each other. As a result, it is difficult to distinguish the signal. The noise reducing apparatus 107 for removing the MAI noise to extract a clear signal is necessarily required in the OCDMA system.

Figure 2:
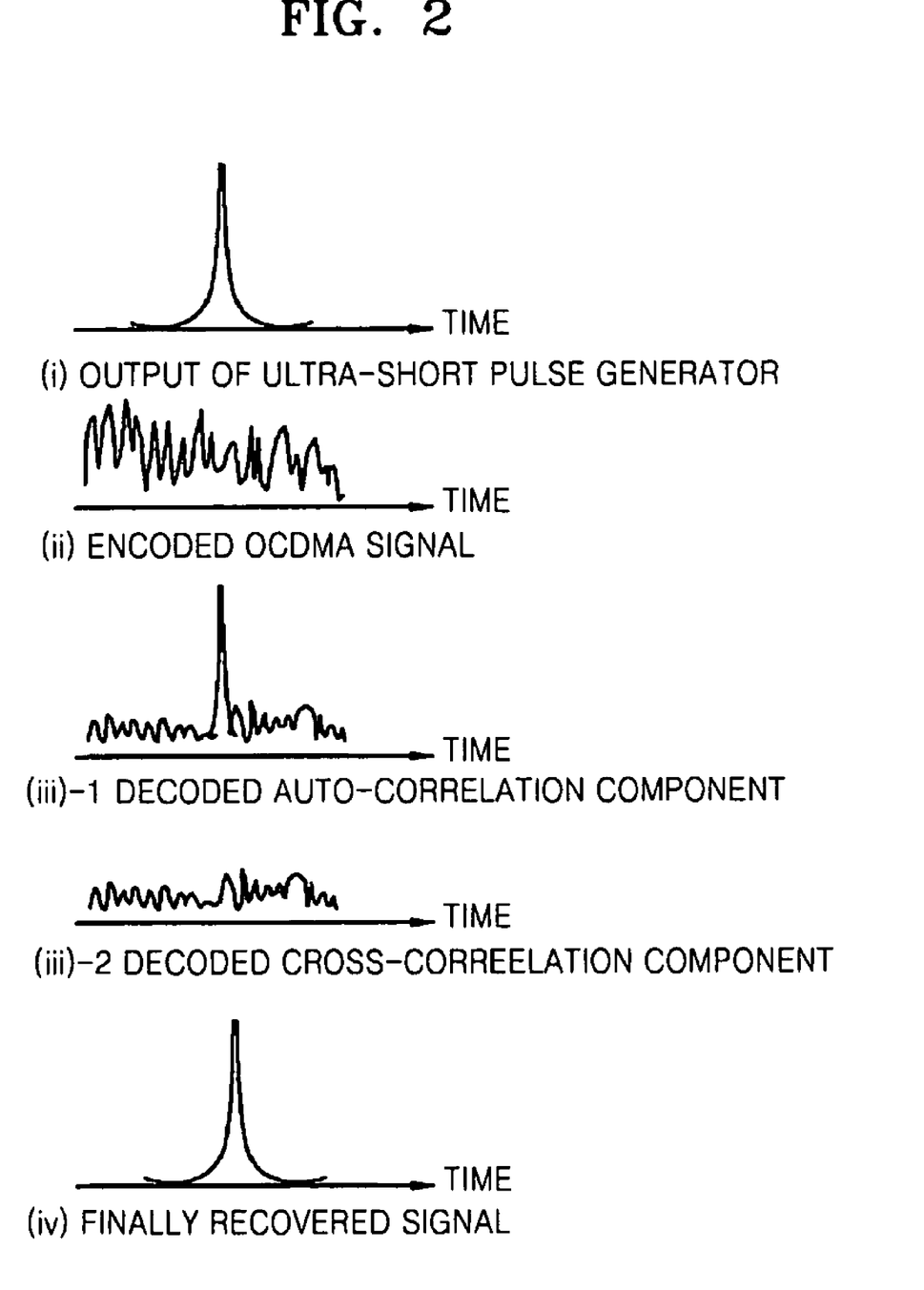
FIG. 2 is a view illustrating waveforms at respective nodes of an OCDMA network shown in FIG. 1.

FIG. 2 is a view illustrating waveforms at respective nodes of an OCDMA network shown in FIG. 1.

FIG. 2 (ii) illustrates an output signal of the OCDMA encoder 103 spreading in a time domain and thus having high security. As a large number of chips are used for encoding, an encoded signal further spreads.

Referring to FIG. 2 (iii)-1, if an input signal suitable for predetermined codes, the output signal of the OCDMA decoder 106 generates an auto-correlation peak component having a narrow pulse width and a large power.

As shown in a graph of FIG. 2 (iii)-2, an input signal having codes unsuitable for the predetermined codes spreads in a time domain during a decoding process and generates a cross-correlation component having a power that is remarkably reduced.

The OCDMA receiver 105 can recover a desired signal using a large difference between the auto-correlation peak component and the cross-correlation component.

Figure 3:
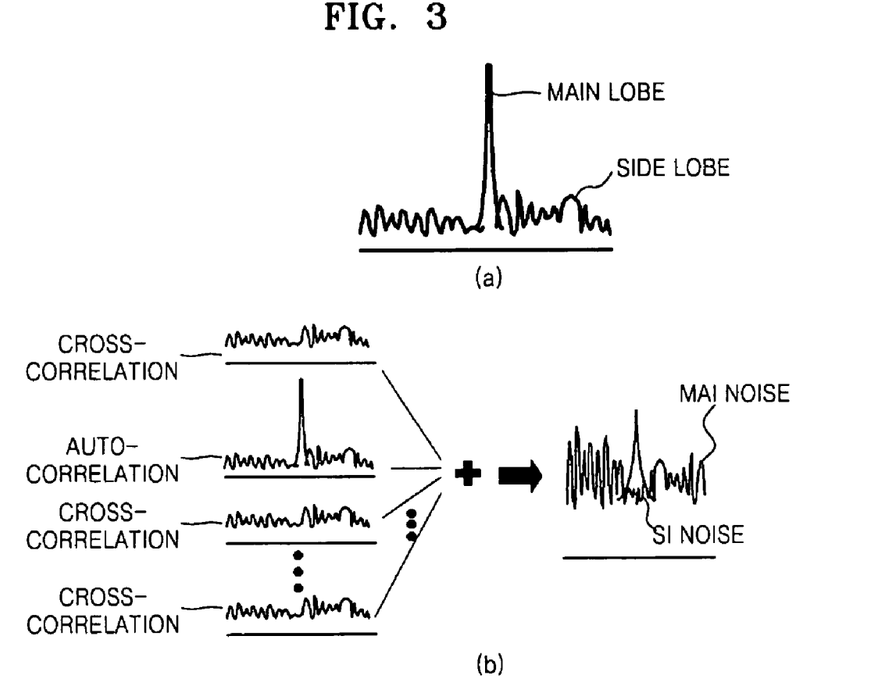
FIG. 3 is a view illustrating an output waveform of a decoder depending on a number of channels input to an OCDMA receiver at the same time.

FIG. 3 is a view illustrating waveforms output from a decoder depending on a number of channels accessing the OCDMA receiver 105 at the same time.

FIG. 3(a) illustrates waveforms generated when only a channel is input to the OCDMA receiver 105, and FIG. 3(b) illustrates waveforms generated when a plurality of channels are input to the OCDMA receiver 105 at the same time.

Referring to FIG. 3(a), in a case where a channel is input to the OCDMA receiver 105, it is relatively easy to distinguish side lobes from a main lobe in decoded waveforms.

However, referring to FIG. 3(b), in a case where a plurality of OCDMA signals are input to the OCDMA receiver 105 at the same time, OCDMA signals of input OCDMA signals suitable for the codes determined by the OCDMA decoder 106 output auto-correlation peak components that can be relatively easily distinguished as shown in FIG. 3(b) at an output node of the OCDMA decoder 106. However, OCDMA signals unsuitable for the determined codes output a plurality of cross-correlation components spreading in a time domain.

Therefore, in a case where many channels are input at the same time, a decoded auto-correlation peak component is added to several cross-correlation components. Thus, it is difficult to distinguish side lobes from a main lobe.

Here, a noise added to the side lobes may be classified as MAI noise, and a noise of the main lobe may be classified as SI noise.

If the OCDMA receiver 105 does not receive an OCDMA signal having determined codes and thus an MAI noise is large even when an auto-correlation peak component is not generated, the OCDMA receiver 105 may determine that a signal exists.

The auto-correlation peak component has a high peak optical power within a specific short time. However, an average optical power of the auto-correlation peak component is equal to an average optical power of a cross-correlation component of each channel. Thus, an average optical power of a signal output from the OCDMA decoder 106 is proportional to the number of input channels due to the MAI noise.

In general, a peak optical power of a main lobe required for efficiently reducing noise is determined in noise reducing apparatuses connected to an output node of the OCDMA decoder 106. Thus, if an average optical power of a signal applied to a noise reducing apparatus is not increased with an increase in the number of channels, the peak optical power is decreased. Thus, noise is not efficiently reduced. This means that an optical amplifier used in the noise reducing apparatus must have a saturation power higher than several tens of dBm or more.

In particular, when noise is suppressed using a nonlinear optical fiber-based noise reducing apparatus to which many channels are input at the same time, an optical amplifier cannot supply a high optical power necessary for inducing a nonlinear phenomenon in an optical fiber. Thus, the number of channels one noise reducing apparatus can simultaneously accommodate is limited.

Therefore, an apparatus for removing an increase in an MAI noise of a side lobe with an increase in a number of channels to prevent an optical power input to a noise reducing apparatus from being increased and reducing the MAI noise at a low power is required.

Figure 4:
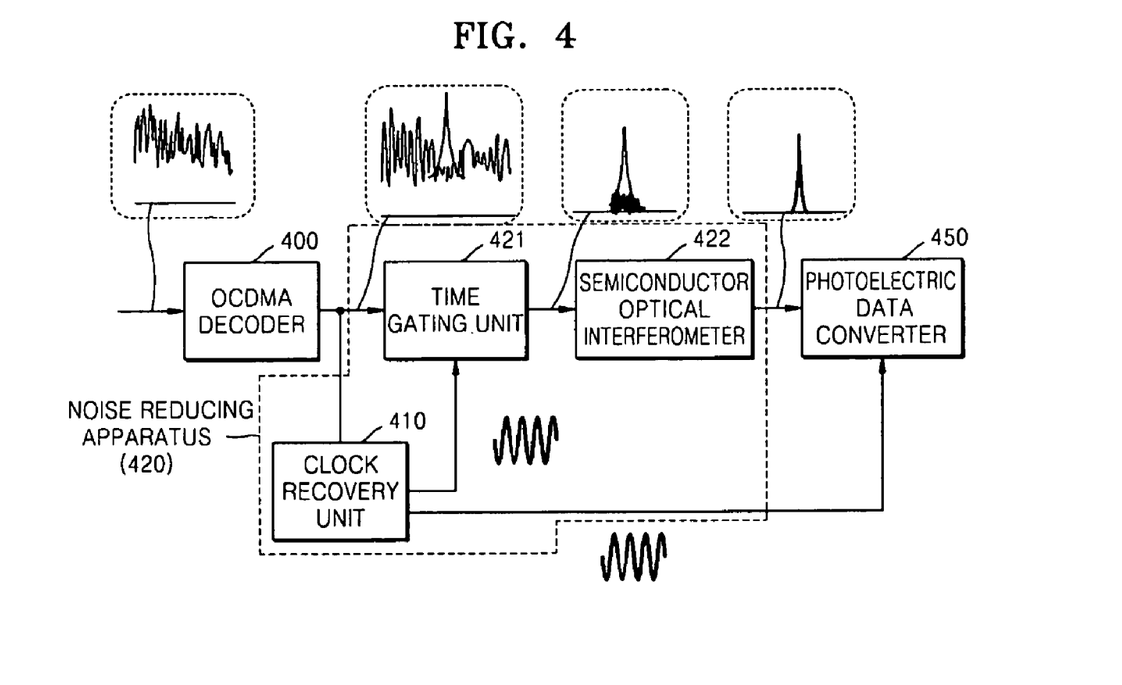
FIG. 4 is a block diagram of an OCDMA receiver including a noise reducing apparatus according to an embodiment of the present invention.

FIG. 4 is a block diagram of an OCDMA receiver including a noise reducing apparatus according to an embodiment of the present invention.

The OCDMA receiver includes an OCDMA decoder 400, a clock recovery unit 410, a time gating unit 421, a semiconductor optical interferometer 422, and a photoelectric data converter 450.

The OCDMA decoder 400 performs an opposite process to that of an OCDMA encoder. The OCDMA decoder 400 generates an auto-correlation peak signal having a narrow pulse width and a large power for one of several input signals suitable for determined codes, the several input signals to which channels encoded into different codes are added.

The other input signals having codes unsuitable for the determined codes generate cross-correlation components of which powers spread in a time domain and thus are remarkably reduced.

The clock recovery unit 410 extracts a clock synchronizing with a signal output from the OCDMA decoder 400 and having a clear sine wave form using a portion of the signal output from the OCDMA decoder 400, the portion including much noise, and transmits the clock to the time gating unit 421 and the photoelectric data converter 450.

Figure 5:
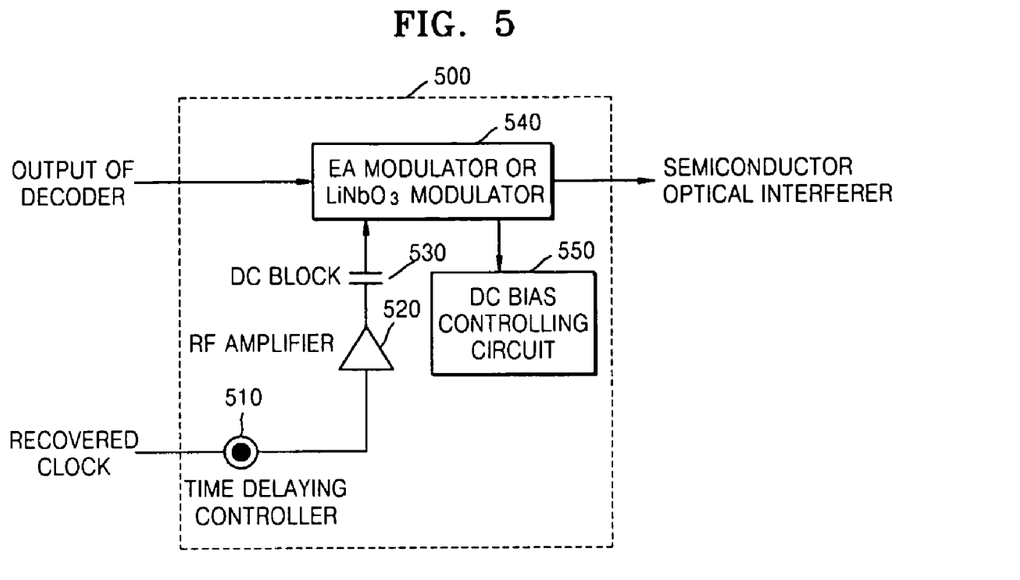
FIG. 5 is a block diagram of a time gating unit of a noise reducing apparatus of an OCDMA receiver according to an embodiment of the present invention.

FIG. 5 is a block diagram of a time gating unit of a noise reducing apparatus of an OCDMA receiver according to an embodiment of the present invention.

The time gating unit of the noise reducing apparatus is a time gating apparatus using an electro-absorption (EA) modulator or a LiNbO$_3$ modulator.

A time gating unit 500 amplifies a sine wave clock received from the clock recovery unit 410 using a radio frequency (RF) amplifier 520, removes a direct current (DC) component from the sine wave clock in a DC block 530, and inputs the sine wave clock to an EA modulator or a LiNbO$_3$ modulator 540.

Here, the time gating unit 500 adjusts a phase (or a delay time) of the sine wave clock using an RF phase shifter 510 and controls a DC bias of the EA modulator or the LiNbO$_3$ modulator 540 through a DC bias controlling circuit 550.

Thus, the time gating unit 500 can determine a signal component of a signal output from the OCDMA decoder 400 that can pass through a time domain. In the present invention, only a mina lobe can pass through the time domain.

Thus, the main lobe of the signal output from the OCDMA decoder 400 is extracted using the sine wave clock received from the clock recovery unit 410, and a MAI noise existing in a side lobe is removed.

The MAI noise occupying a considerable part of an optical power does not pass through the time gating unit 500, but only the main lobe passes through the time gating unit 500. Thus, a proportion of the optical power input to the semiconductor optical interferometer 422 to a number of input OCDMA channels can be solved.

An optical power value of the MAI noise removed by the time gating unit 500 is increased with a decrease in a pulse width of the main lobe of an auto-correlation peak. For example, if the pulse width of the main lobe is 50% of a bit rate, 50% of the optical power of the MAI noise is removed. If the pulse width of the main lobe is 10% of the bit rate, 90% of the optical power of the MAI noise is removed.

In general, a pulse width of a main lobe is within a range of 5 ps at a transmission speed of 10Gb/s at which a bit rate is 100 ps. Thus, about 95% of an MAI noise may be removed.

The main lobe of the auto-correlation peak selected by the time gating unit 500 is input to the semiconductor optical interferometer 422. The semiconductor optical interferometer 422 removes an SI noise remaining the main lobe due to a nonlinear transmission characteristic of an SOA.

The semiconductor optical interferometer 422 generally operates at an optical power of 1 mW or less. Thus, the semiconductor optical interferometer 422 can easily remove the SI noise without an high power optical fiber amplifier.

Although now shown, an optical amplifier and an optical attenuator may be used between blocks constituting the OCDMA receiver including the noise reducing apparatus 420 shown in FIG. 4.

Figure 6:
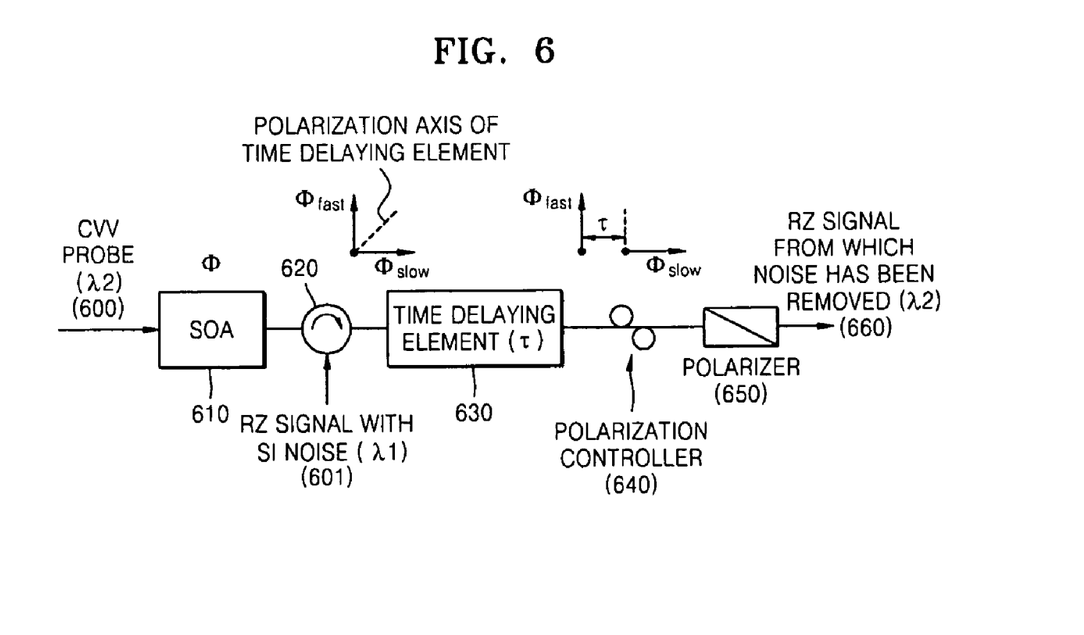
FIG. 6 is a block diagram of an optical interferometer including an SOA in a noise reducing apparatus of an OCDMA receiver according to an embodiment of the present invention.

FIG. 6 is a block diagram of an optical interferometer including an SOA in a noise reducing apparatus of an OCDMA receiver according to an embodiment of the present invention. Referring to FIG. 6, the optical interferometer includes an SOA 610, an optical circulator 620, continuous wave (CW) probe light 600 having a wavelength of $\lambda_2$, a time delaying element 630, a polarization controller 640, and a polarizer 650.

An RZ signal 601 including an SI noise and having a wavelength of $\lambda_1$ is applied through the optical circulator 620 to a rear side of the SOA 610. The RZ signal 601 varies the density of a carrier in the SOA 610 so as to vary a refractive index in the SOA 610.

Figure 7:
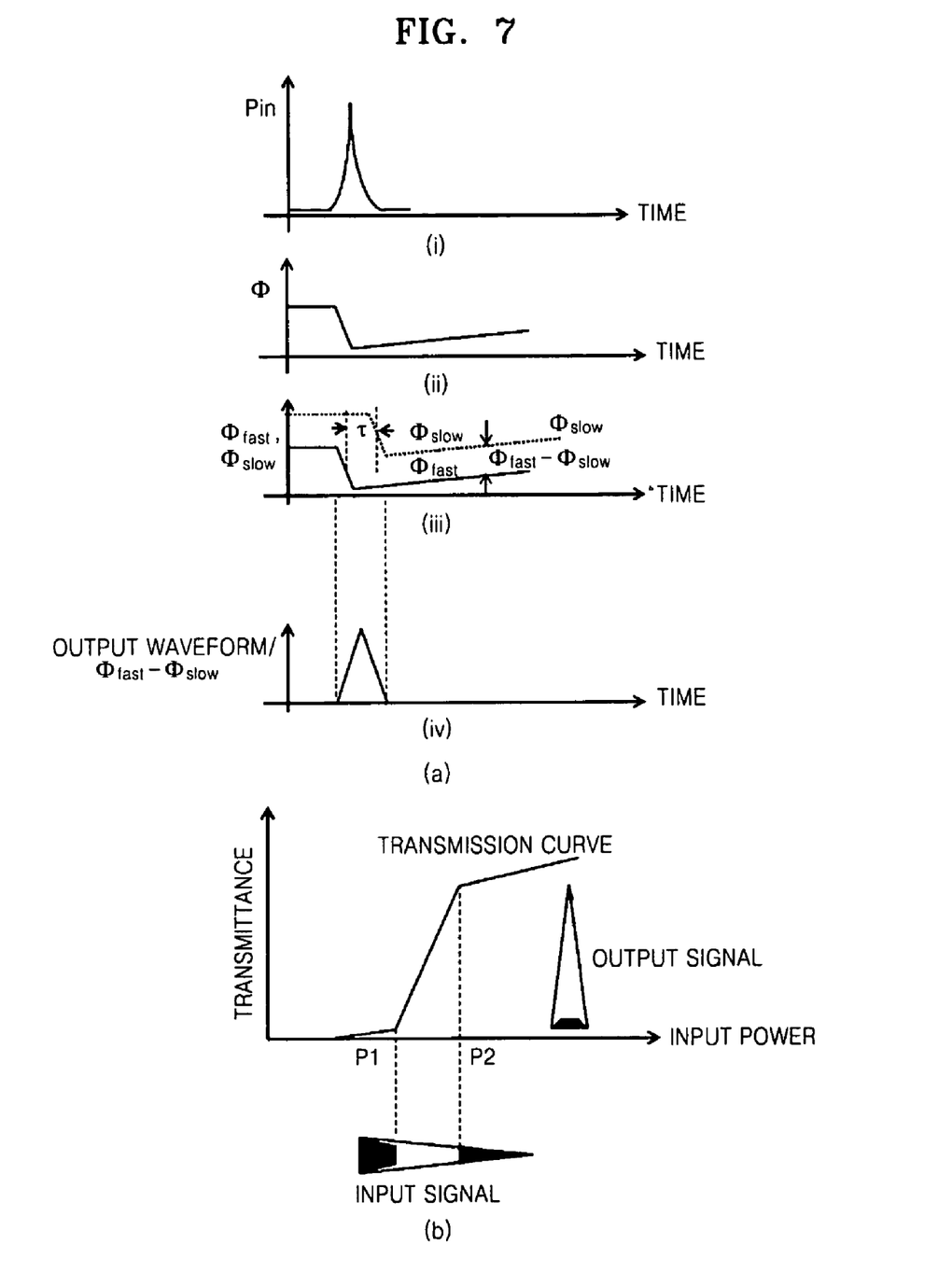
FIG. 7 is a graph illustrating a phase pattern, an input output waveform, and an input output transmission curve occurring in the optical interferometer shown in FIG. 6.

Thus, the variation in the refractive index of the SOA 610 causes a phase shift φ of the CW probe light 600 as shown in FIG. 7(a)-ii. The phase shift φ quickly increases in proportion to a rising edge of an input signal and slowly decreases in proportion to a time required for recovering the carrier.

The CW probe light 600 may be phase modulated, and an intensity of the CW probe light may not vary. However, the application of the RZ signal 601 causes cross gain modulation (XGM) as well as XPM on the CW probe light 600. Thus, the intensity of the CW probe light 600 may be distorted.

If the RZ signal 601 is applied in an opposite direction to the CW probe light 600 to minimize the distortion of the intensity of the CW probe light 600, the RZ signal 601 is amplified. Thus, the CW probe light 600 is phase modulated on an initial stage. As a result, the CW probe light 600 may be phase modulated at a relatively lower optical power of the RZ signal 601 than when the RZ signal 601 is applied in the same direction as the CW probe light 600, so as to reduce XGM in the SOA 610.

The CW probe light 600 phase modulated input through the optical circulator 601 to the time delaying element 630. If a polarization direction of the CW probe light 600 is controlled to be at an angle of 45° with a polarization axis of the time delaying element 630, the phase modulation component φ is divided into two orthogonal components $\phi_{fast}$ and $\phi_{slow}$ having the same amplitude E1 and output signals that can be expressed as in Equation 1:

$$\bar{E}_0 = \bar{e}_1 E_1 \exp[i\Phi_{fast}(t)] + \bar{e}_2 E_2 \exp[i\Phi_{slow}(t)], \bar{e}_1 \perp \bar{e}_2 \quad (1)$$

Wherein $E_0$ denotes a phase modulated CW probe optical signal, $E_1$ denotes amplitudes of two polarization components, $\bar{e}_1$ denotes a vector of a fast polarization component, and $\bar{e}_2$ denotes a vector of a slow polarization component.

Here, a direction of a polarizer is at an angle of 45° with the fast polarization component $\bar{e}_1$ that is at an angle of 90° with the slow polarization component $\bar{e}_2$. The fast polarization component $\phi_{fast}$ advanced faster than the slow polarization component $\phi_{slow}$ by τ. Two phase modulation components are delayed by τ at an output node of the time delaying element 630 as shown in FIG. 7(a)-iii.

Intensity of a power of the polarizer can be expressed as in Equation 2:

$$|\bar{E}_0| = \left| \frac{1}{\sqrt{2}} E_1 \exp[i\Phi_{fast}(t)] + E_1 \exp[i\Phi_{slow}(t)] \right|^2 = \quad (2)$$

$$2|E_1|^2 \cos^2\left[\frac{\Phi_{fast}(t) - \Phi_{slow}(t)}{2}\right]$$

wherein $|\bar{E}_0|^2$ denotes an intensity of an output signal of the polarizer, and $|\bar{E}_1|^2$ denotes an intensity of a polarization signal component.

When an input signal having a wavelength of $\lambda_1$ is applied to the polarizer 650 using the polarization controller 640, a phase difference between the fast polarization component $\phi_{fast}$ and the slow polarization component $\phi_{slow}$ is controlled to be 180°. Thus, a signal is not output.

When the phase difference between the fast polarization component $\phi_{fast}$ and the slow polarization component $\phi_{slow}$ is controlled to be 180° and the input signal having the wavelength of $\lambda_1$ is applied to the polarizer 650, an additional phase difference occurs between the fast polarization component $\phi_{fast}$ and the slow polarization component $\phi_{slow}$. Also, two time delay components of an output of the polarizer 650 interfere with each other. As shown in FIG. 7(a)-iv, a value corresponding to a difference between the fast polarization component $\phi_{fast}$ and the slow polarization component $\phi_{slow}$ is output to the polarizer 650. Thus, input information of an RZ input signal having a wavelength of $\lambda_1$ and including an SI noise is transferred to CW probe light having a wavelength of $\lambda_2$ so as to output the RZ input signal.

A pulse width of the CW probe light is proportional to the time delay τ. Thus, differently from a conventional method of connecting NOLMs in series to inhibit an optical noise, a width of recovered pulses may vary by τ without varying an optical power of an input signal in an OCDMA receiver including a noise reducing apparatus according to the present invention.

An optical interferometer of a noise reducing apparatus according to the present invention has input and output transmission characteristics as shown in FIG. 7B. When an optical power of an input signal is less than or equal to $P_1$, a phase shift occurring in an SOA is very slight. When the optical power of the input signal is more than or equal to $P_2$, the phase shift is saturated. Thus, the phase shift does not linearly increase in proportion to the power of the input signal.

Therefore, a considerable portion of a noise power of the input signal smaller than $P_1$ or a noise power larger than $P_2$ is inhibited at an output node due to input and output transmission curves. In general, an average optical power between $P_1$ and $P_2$ necessary for inducing the phase shift in the SOA is 1 mW or less. Thus, an SI noise can be removed from an OCDMA decoded signal at a low optical power.

FIG. 7 is a graph illustrating a phase pattern, input and output waveforms, and input and output transmission curves occurring in the optical interferometer shown in FIG. 6.

FIG. 7(a)-(i) shows an input waveform of an optical interferometer including an SOA in a noise reducing apparatus of an OCDMA receiver according to the present invention. FIG. 7(a)-(ii) shows a phase shift pattern, FIG. 7(a)-(iii) denotes phases and time delays of two polarization components in a time delaying element, FIG. 7(a)-(iv) shows an output waveform, and FIG. 7(b) shows input and output transmission curves of the optical interferometer.

Figure 8:
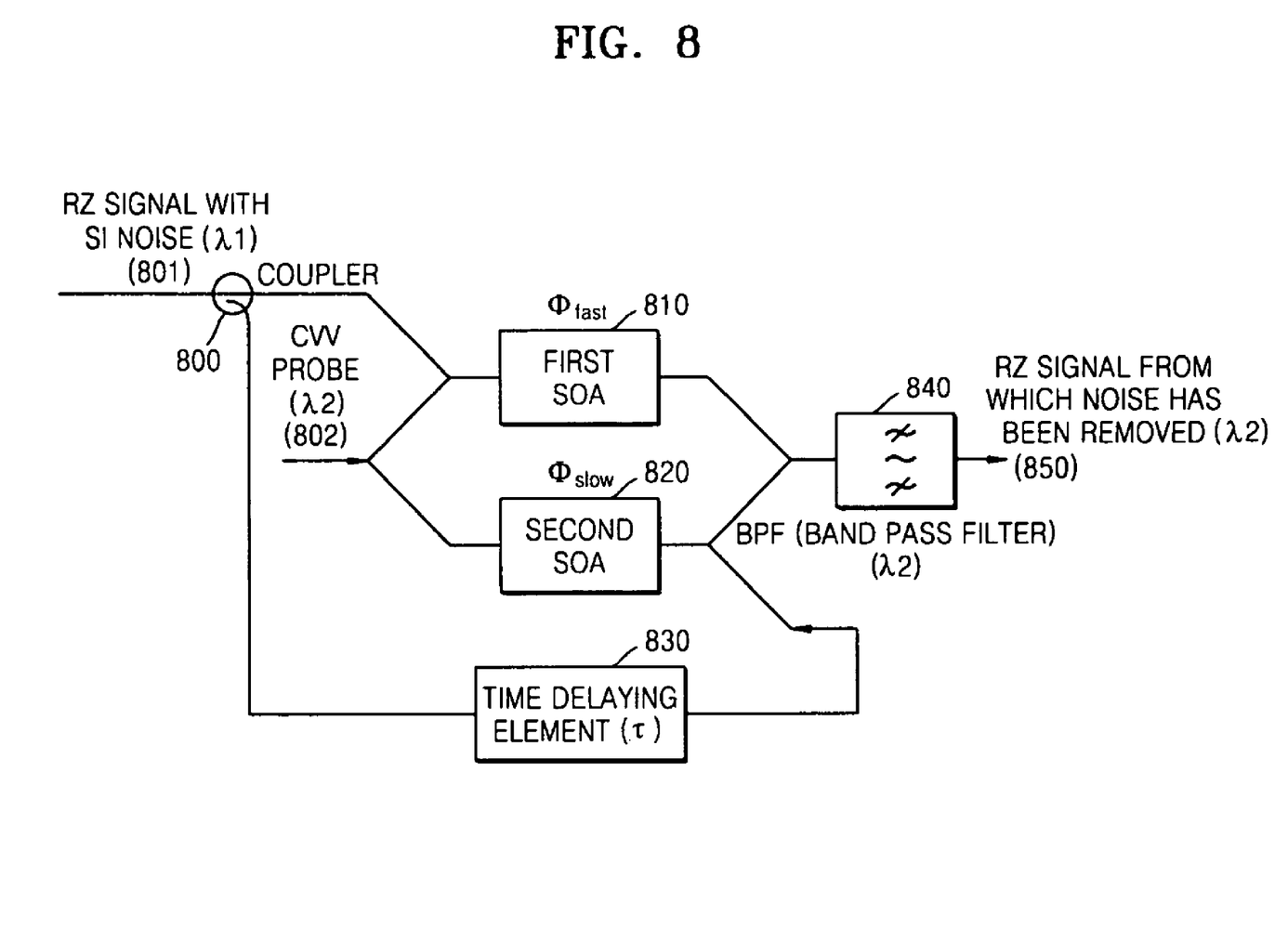
FIG. 8 is a block diagram of an optical interferometer including two SOAs in a noise reducing apparatus of an OCDMA receiver according to another embodiment of the present invention.

FIG. 8 is a block diagram of an optical interferometer including two SOAs in a noise reducing apparatus of an OCDMA receiver according to another embodiment of the present invention. Referring to FIG. 8, the optical interferometer includes first and second SOAs 810 and 820 connected to each other as Mach-Zehnder structures, a coupler 800, a time delaying element 830, and a band pass filter (BPF) 840. An RZ signal 801 including an SI noise and having a wavelength of $\lambda_1$ is divided into two signals via the coupler 800. One of the two signals is applied a front face of the first SOA 810, and the other one of the two signals is delayed by and then applied to a rear face of the second SOA 820.

The RZ signal 801 and CW probe light 802 advance forward in the first SOA 810 but backward in the second SOA 820. As described above, a structure in which an RZ signal and CW probe light advance forward and backward two SOAs compensate for XGM occurring in the two SOAs so that an optical interferometer operates fast.

An applied RZ signal causes a phase shift in CW probe light as shown in FIG. 7(a)-iii, and the applied RZ signal and the CW probe light interfere with each other so as to generate a signal as shown in FIG. 7(a)-iv. An MZI using an SOA has input and output transmission characteristics as shown in FIG. 7(b). Thus, an SI noise can be removed from an OCDMA decoded signal at a low optical power.

Figure 9:
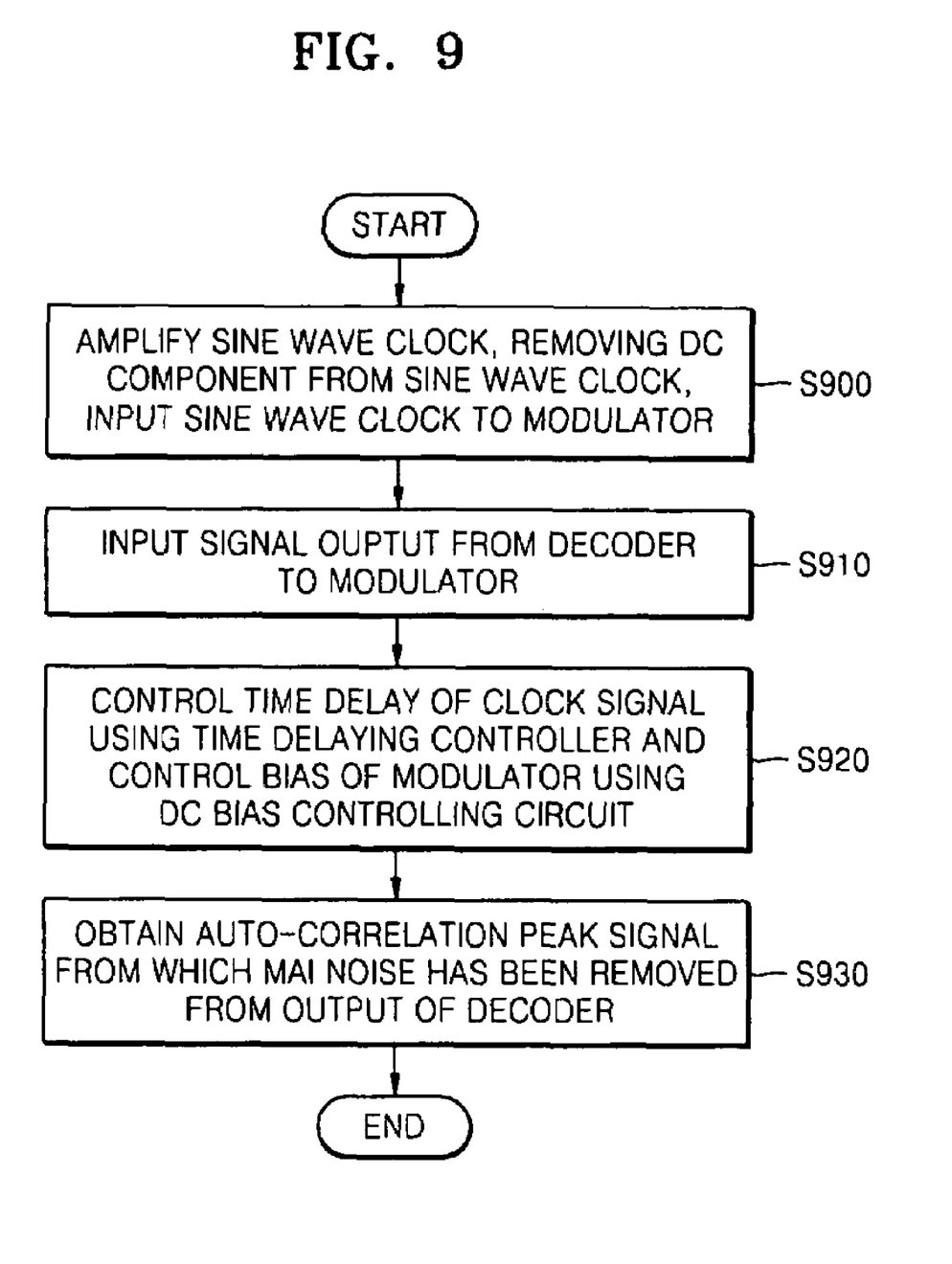
FIG. 9 is a flowchart of a method of obtaining an auto-correlation peak signal of which MAI noise has been removed from a signal output from a decoder in the time gating unit shown in FIG. 5.

FIG. 9 is a flowchart of a method of obtaining an auto-correlation peak signal of which MAI noise has been removed from an output of a decoder in the time gating unit shown in FIG. 5. In operation S900, a sine wave clock signal obtained by a clock recovery unit is amplified by an RF amplifier, and a DC component is removed from the sine wave clock signal by a DC block unit so as to input the sine wave clock signal to an EA modulator or a LiNbO$_3$ modulator. In operation S910, a signal output from a decoder is input to the EA modulator or the LiNbO$_3$ modulator.

In operation S920, a phase (or a time delay) of the sine wave clock signal is controlled using a phase shifter, and a bias of the EA modulator or the LiNbO$_3$ modulator is controlled by a DC bias controller. Thus, a component of the signal output from the decoder that can pass through a time domain can be determined, and in the present invention, only a main lobe passes through the time domain.

In operation S930, only a main lobe is extracted from the signal output from the decoder using the sine wave clock signal received from the clock recovery unit, and a MAI noise is removed from a side lobe. Also, the MAI occupying a considerable portion of an optical power of the signal output from the decoder fails to pass through the time gating unit, but only the main lobe passes through the time gating unit. Thus, an increase in an optical power input to a semiconductor optical interferometer in proportion to the number of input OCDMA channels can be solved.

Figure 10:
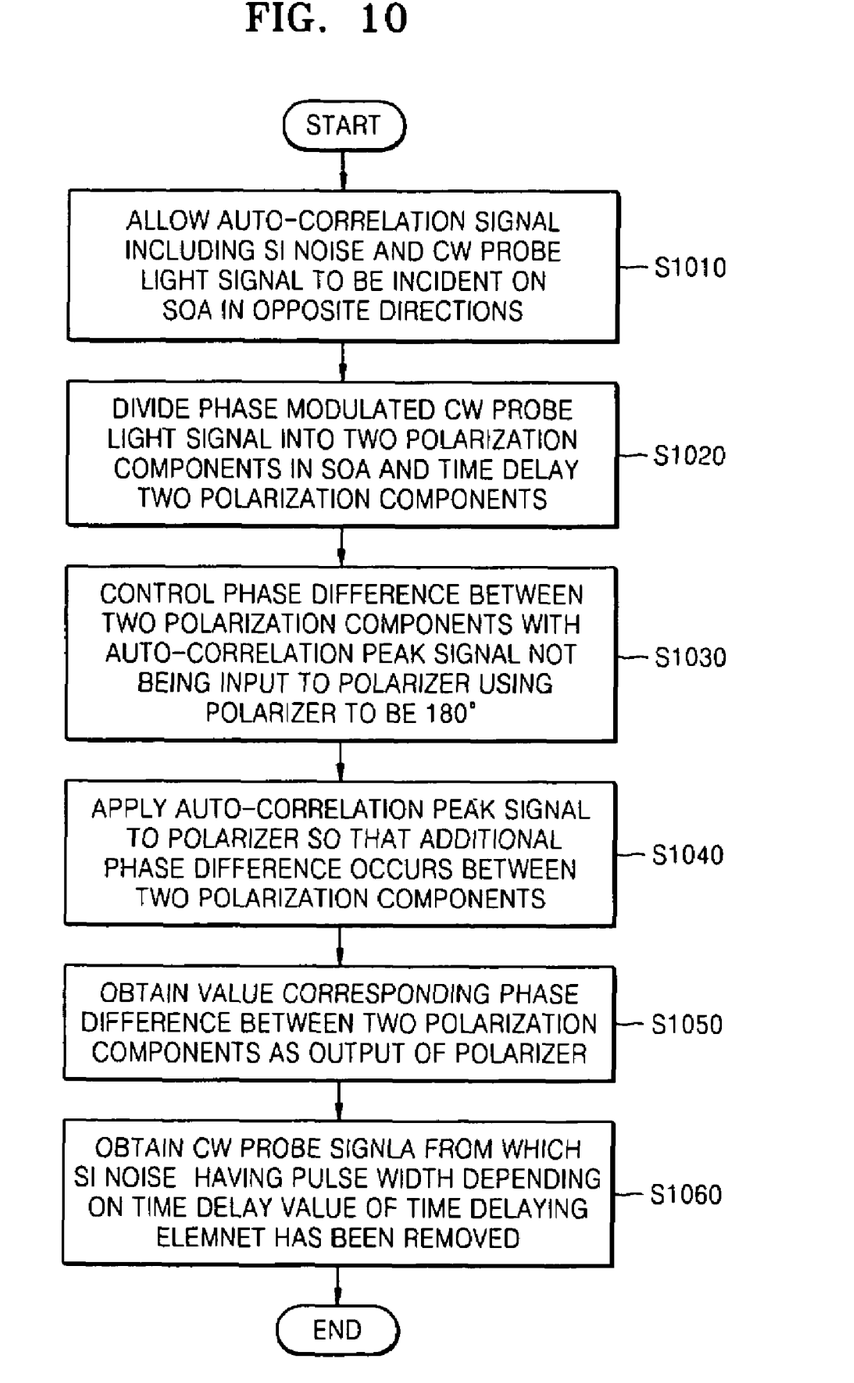
FIG. 10 is a flowchart of a method of removing an SI noise from the optical interferometer shown in FIG. 6.

FIG. 10 is a flowchart of a method of removing an SI noise from the optical interferometer shown in FIG. 6.

In operation S1010, an auto-correlation peak signal output from a time gating unit, including an SI noise, and having a wavelength of $\lambda_1$ and a CW probe signal having a wavelength $\lambda_2$ are incident on a semiconductor optical amplifier in opposite directions. CW probe signal phase modulated due to a nonlinear characteristic of an SOA and then input through a circulator to a time delaying element.

In operation S1020, the CW probe optical is divided into two polarization component signals, and a time delay occurs between the two polarization component signals. In operation S1030, a phase difference between fast and slow polarization components $\phi_{fast}$ and $\phi_{slow}$ is controlled to be 180° by a polarization controller so that the auto-correlation peak signal is not input to a polarizer, so as not to output a signal.

In operation S1040, the auto-correlation signal is applied to the polarizer with a polarization axis of the polarizer fixed to keep the phase shift, so that an additional phase difference occurs between two polarization components. In operation S1060, a CW probe signal of which SI noise has been removed is obtained, the CW probe signal having a pulse width depending on a time delay value of the time delaying element.

Figure 11:
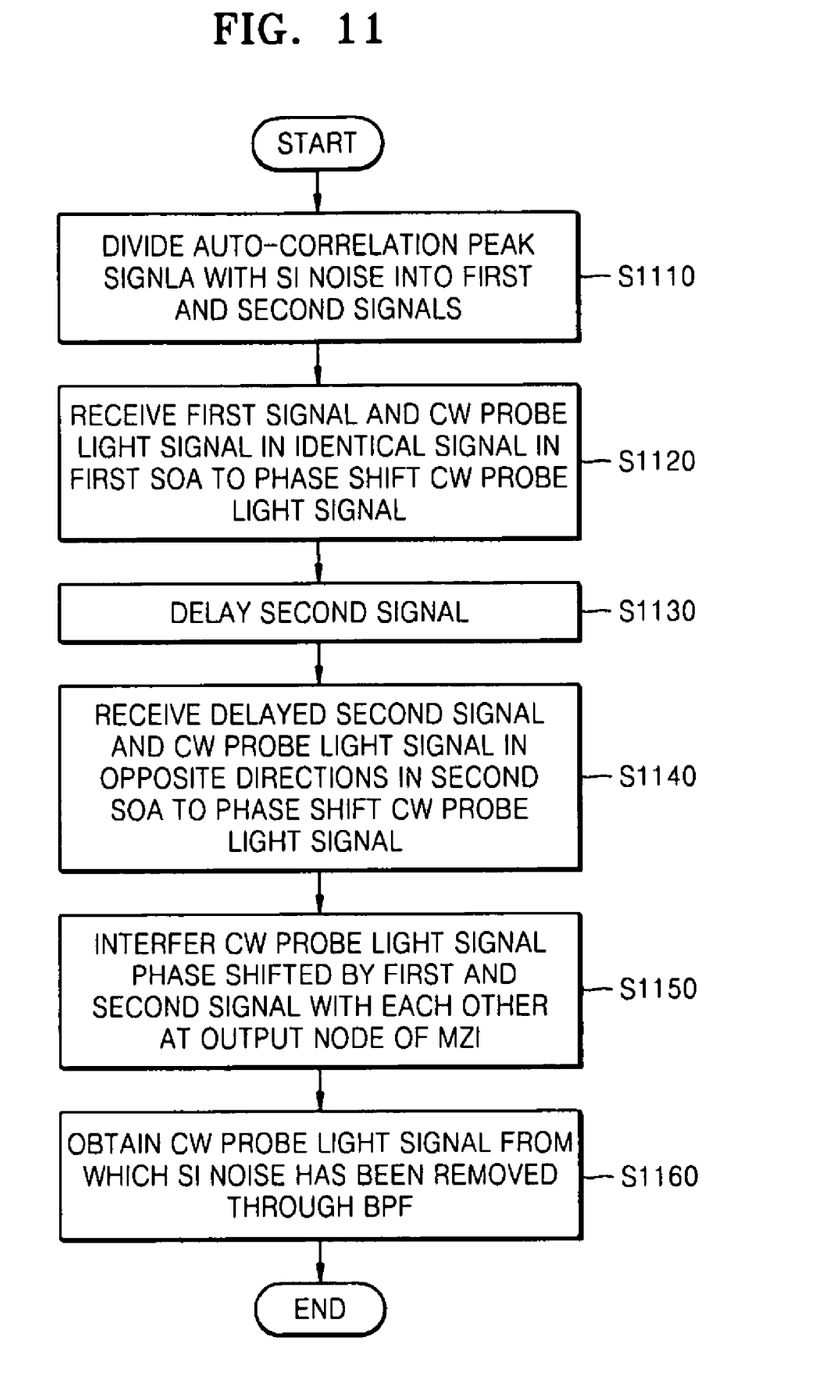
FIG. 11 is a flowchart of a method of removing a Si noise from the optical interferometer shown in FIG. 8.

FIG. 11 is a flowchart of a method of reducing a SI noise from the optical interferometer shown in FIG. 8.

In operation S1110, an auto-correlation peak signal including an SI noise and a having a wavelength of $\lambda_1$ is divided into first and second signals via a coupler. The first signal is applied to a front face of a first SOA, and the second signal is delayed by τ and then applied to a rear face of a second SOA.

In operation S1120, the auto-correlation peak signal and CW probe light advance forward in the first SOA. In operation S1130, the auto-correlation peak signal and the CW probe light advance backward in the second SOA. In operation S1140, the auto-correlation signal applied to the first SOA causes a phase shift in the CW probe light. In operation S1150, a CW probe signal phase shifted by the first signal and a CW probe signal phase shifted by the second signal interfere with each other at an output node of a MAI.

In operation S1160, the auto-correlation peak signal has information as to the wavelength of $\lambda_1$, but the wavelength is converted into a wavelength of $\lambda_2$ to output a signal from which an SI noise has been removed, together with the auto-correlation peak signal so as to obtain a signal from which an SI noise has been removed from an output of a BPF passing the wavelength of $\lambda_2$.

Figure 12:
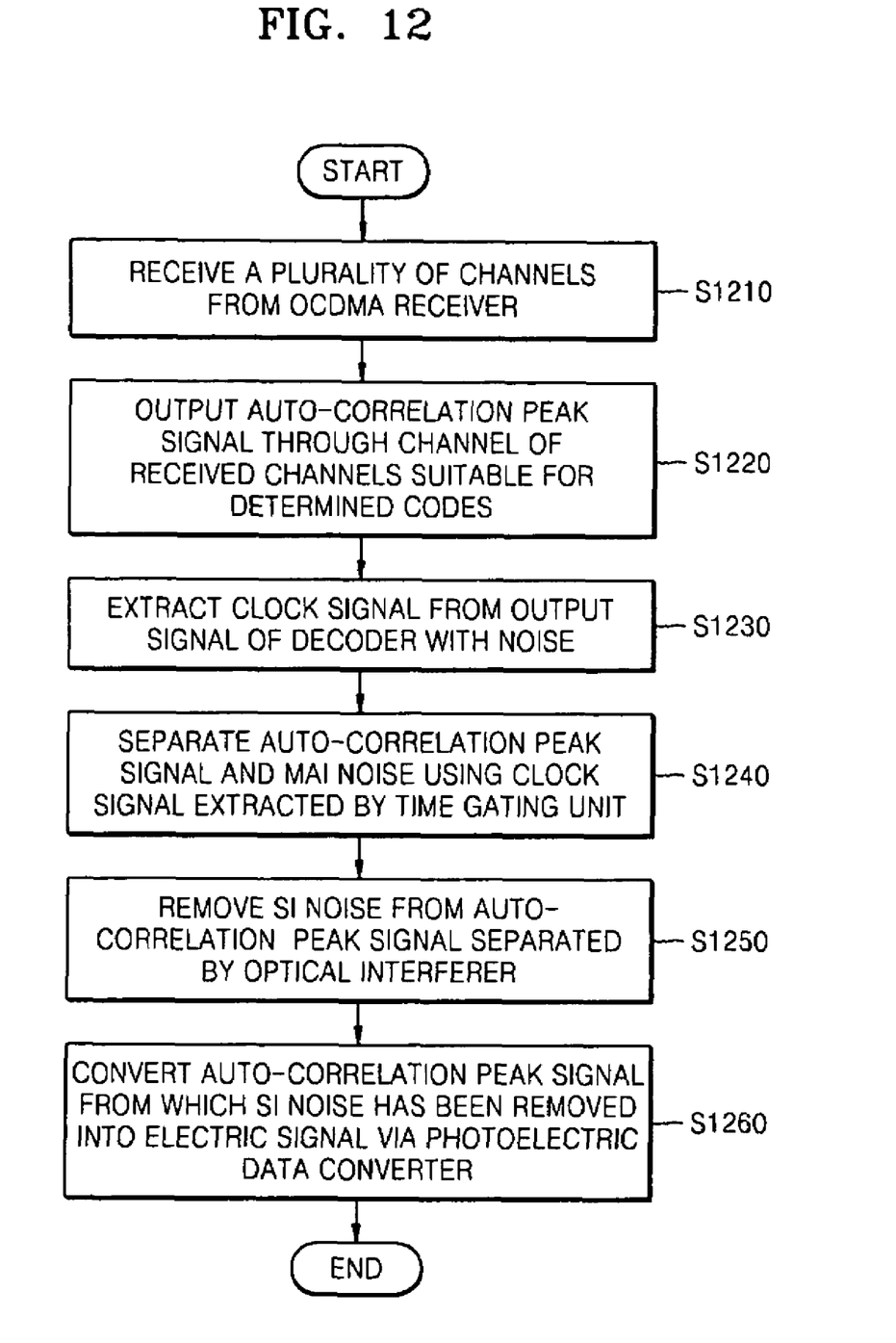
FIG. 12 is a flowchart of a method of operating an OCDMA receiver including a noise reducing apparatus according to an embodiment of the present invention.

FIG. 12 is a flowchart of a method of operating an OCDMA receiver including a noise reducing apparatus according to an embodiment of the present invention.

In operation S1210, an OCDMA receiver receives a plurality of channels at the same time. In operation S1220, a channel of the received channels suitable for determined codes output an auto-correlation peak component that can be relatively easily distinguished at an output node of a decoder, but the other channels unsuitable for the determined codes output several cross-correlation components spreading in a time domain.

In operation S1230, a clock recovery unit extracts a clock signal from the auto-correlation peak signal including an MAI noise. In operation S1240, the MAI noise as a side lobe is separated from the auto-correlation peak signal using the extracted clock signal. In operation S1250, an optical interferometer removes an SI noise from the auto-correlation peak signal using a nonlinear characteristic of a semiconductor optical amplifier. In operation S1260, the auto-correlation peak signal is converted into an electric signal by a photoelectric data receiver.

As described above, in an apparatus and a method for reducing a signal noise of an OCDMA receiver and an OCDMA receiver and method according to the present invention, the OCDMA receiver can include a semiconductor-based time gating unit and an SOA-based optical interferometer. Thus, an increase in an MAI noise with an increase in a number of channels can be removed to prevent an optical power input to the SOA-based optical interferometer from being increased. As a result, a remaining SI noise can be removed at a low power to increase a power dynamic range of the OCDMA receiver so as to increase a number of simultaneously accessible OCDMA channels.

In addition, a pulse width of a recovered signal can be easily converted. Furthermore, the OCDMA receiver can be easily integrated with compact size.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for reducing noise of an OCDMA (optical code division multiple access) receiver, comprising:
    a clock recovery unit extracting sine wave clock from an output signal of an OCDMA decoder including an MAI (multiple access interference) noise;
    a time gating unit separating an auto-correlation peak signal and the MAI noise from the output signal of the OCDMA decoder using the sine wave clock; and
    an optical interferometer removing an SI (signal interference) noise remaining in the auto-correlation peak signal.

2. The apparatus of claim 1, wherein the time gating unit comprises:
    a modulator removing the MAI noise from the output signal of the OCDMA decoder in the OCDMA receiver using the sine wave clock which is amplified and from which DC (direct current) component is removed to output the auto-correlation peak signal;
    a time delay controller controlling a peak value of the sine wave clock input to the modulator so as to be equal to a peak value of the auto-correlation peak signal; and a DC bias controller controlling transmission characteristics of input and output signals of the modulator.

3. The apparatus of claim 2, wherein the modulator is one of a LiNbO$_3$ modulator or an EA (electro-absorption) modulator.

4. The apparatus of claim 1, wherein the optical interferometer comprises:
  an SOA (semiconductor optical amplifier) receiving the auto-correlation peak signal and a CW (continuous wave) probe light in opposite directions to output a phase modulated CW probe light signal;
  a time delaying unit dividing the phase modulated CW probe light having a specific polarization axis into fast and slow polarization components and delaying the fast and slow polarization components; and
  a polarizer keeping a time delay between the fast and slow polarization components and passing only specific components of the fast and slow polarization components.

5. The apparatus of claim 4, wherein the optical interferometer further comprises a circulator positioned between the SOA and the time delaying unit, converting a direction of the auto-correlation peak signal without a loss to output the auto-correlation peak signal to a rear face of the SOA, and inducing the phase modulated CW probe light to the time delaying unit.

6. The apparatus of claim 1, wherein the optical interferometer is a MZI (Mach-Zehnder interferometer).

7. The apparatus of claim 1, wherein the optical interferometer comprises:
  an optical coupler dividing the auto-correlation signal into first and second signals;
  a first SOA receiving the first signal and a CW probe light in an identical direction to shift phase of the CW probe light;
  a time delaying unit delaying the second signal for a specific period of time;
  a second SOA receiving the CW probe light and the delayed second signal in opposite directions to shift phase of the CW probe light; and
  a BPF (band pass filter) passing a signal from which an SI noise remaining in the auto-correlation peak signal obtained by interfering the CW probe light signals phase shifted by the first and second SOAs is removed.

8. A method of reducing a signal noise of an OCDMA receiver, comprising:
  extracting a sine wave clock from an output signal of an OCDMA decoder including an MAI noise;
  separating an auto-correlation peak signal and the MAI noise from the output signal of the OCDMA decoder using the sine wave clock; and
  removing an SI noise remaining in the auto-correlation peak signal.

9. The method of claim 8, wherein the separating of the auto-correlation peak signal and the MAI noise from the output signal of the OCDMA decoder using the sine wave clock comprises:
  removing the MAI noise from the output signal of the OCDMA decoder in the OCDMA receiver using the sine wave clock which is amplified and from which DC (direct current) component is removed to output the auto-correlation peak signal;
  controlling a peak value of the sine wave clock input to the modulator so as to be equal to a peak value of the auto-correlation peak signal; and
  controlling transmission characteristics of input and output signals of the modulator.

10. The method of claim 8, wherein the removing of the SI noise remaining in the auto-correlation peak signal comprises:
  receiving the auto-correlation peak signal and a CW (continuous wave) probe light in opposite directions to output a phase modulated CW probe light;
  dividing the phase modulated CW probe light having a specific polarization axis into fast and slow polarization components and delaying the fast and slow polarization components; and
  keeping a time delay between the fast and slow polarization components and passing only specific components of the fast and slow polarization components
  obtaining a signal from which an SI noise remaining in the auto-correlation peak signal is removed by interfering the fast and slow polarization components with each other.

11. The method of claim 8, wherein the removing of the SI noise remaining in the auto-correlation peak signal comprises:
  dividing the auto-correlation peak signal into first and second signals;
  receiving the first signal and a CW probe light in an identical direction to shift phase of the CW probe light;
  delaying the second signal for a specific period of time;
  receiving the CW probe light signal and the delayed second signal in opposite directions to shift phase of the CW probe light; and
  obtaining a signal from which an SI noise remaining in the auto-correlation peak signal obtained by interfering the CW probe light signals phase shifted by the first and second signals with each other is removed.

12. An OCDMA receiver comprising:
  an OCDMA decoder decoding and outputting an input signal;
  a noise reducing apparatus separating an auto-correlation peak signal and an MAI noise using a sine wave clock extracted from an output of the OCDMA decoder and removing an SI noise remaining in the auto-correlation peak signal; and
  a photoelectric data converter converting the auto-correlation peak signal from which the SI noise has been removed into an electric signal using the sine wave clock.

13. The OCDMA receiver of claim 12, wherein the noise reducing apparatus comprises a clock recovery unit extracting the sine wave clock from the auto-correlation peak signal comprising an MAI noise as the output of the OCDMDA decoder.

14. The OCDMDA receiver of claim 12, wherein the noise reducing apparatus comprises a time gating unit controls a time delay so that a peak of the extracted sine wave clock is equal to a peak of the auto-correlation peak signal and controlling input and output transmission characteristics of a modulator so as to separate the auto-correlation peak signal and the MAI noise from the output of the OCDMA decoder.

15. The OCMDA receiver of claim 12, wherein the noise reducing apparatus comprises an optical interferometer removing an SI noise remaining in the auto-correlation peak signal.

16. A method of receiving an OCDMA, comprising:
decoding an input signal to output an auto-correlation peak signal including an MAI noise;
extracting a sine wave clock from the auto-correlation peak signal including the MAI noise;
separating the auto-correlation peak signal and the MAI noise using the extracted sine wave clock;
removing an SI noise remaining in the auto-correlation peak signal from which the MAI noise has been removed; and
converting the auto-correlation peak signal into an electric signal using the extracted sine wave clock.

* * * * *